April 21, 1959 W. L. GOODLAD 2,882,909
PEA HARVESTER
Filed March 18, 1955 3 Sheets-Sheet 1

INVENTOR
William L. Goodlad
BY
ATTORNEY

April 21, 1959   W. L. GOODLAD   2,882,909
PEA HARVESTER
Filed March 18, 1955   3 Sheets-Sheet 2
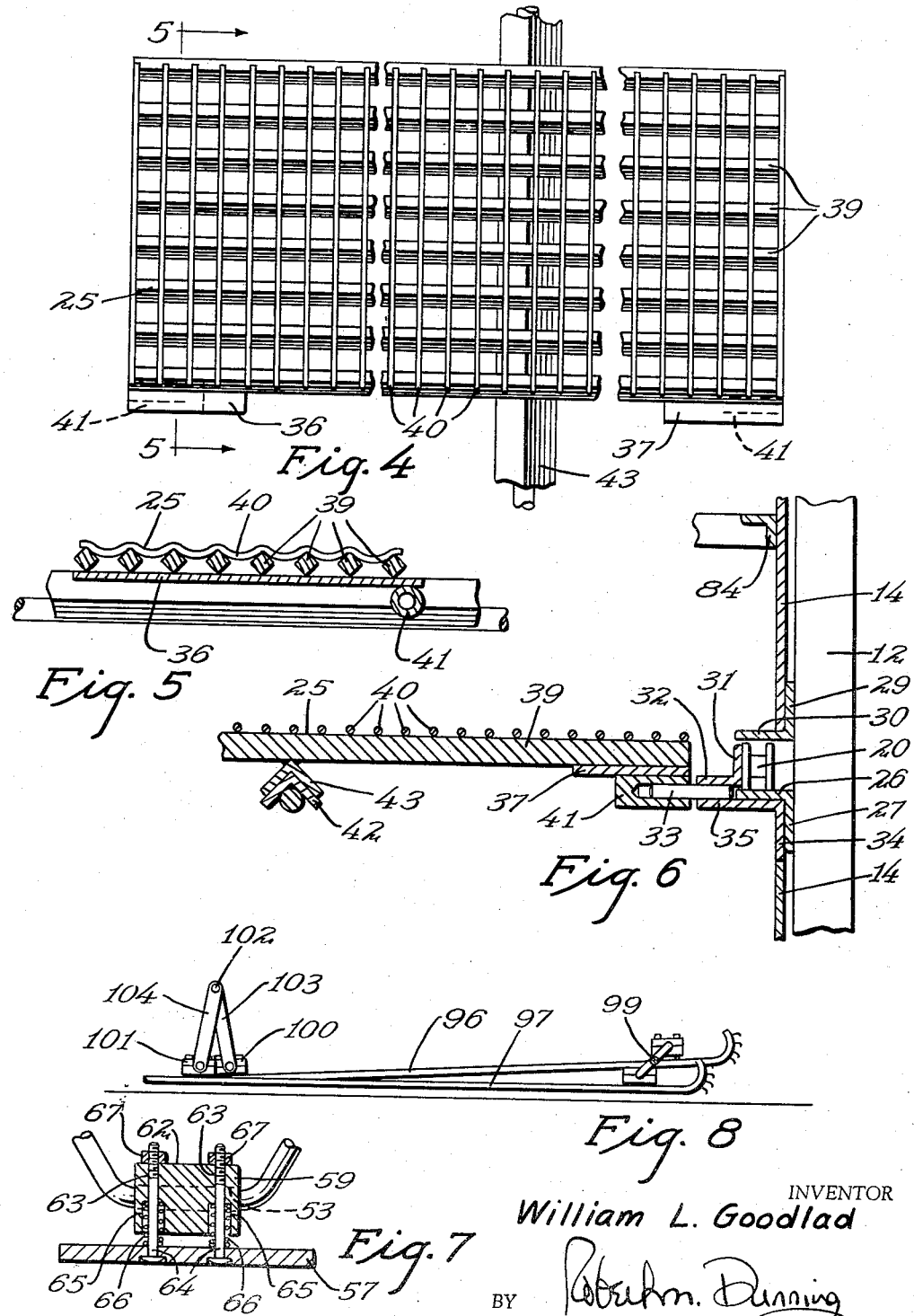
INVENTOR
William L. Goodlad
BY
ATTORNEY April 21, 1959

W. L. GOODLAD 2,882,909

PEA HARVESTER

Filed March 18, 1955

INVENTOR
William L. Goodlad

BY *[signature]*

ATTORNEY

United States Patent Office 2,882,909
Patented Apr. 21, 1959

2,882,909

PEA HARVESTER

William L. Goodlad, New Richmond, Wis.

Application March 18, 1955, Serial No. 495,276

4 Claims. (Cl. 130—30)

This invention relates to an improvement in pea harvesters and deals with an apparatus for separating peas from the vines and pods, collecting the peas in a receptacle and discharging the vines and pods.

An object of the present invention resides in a harvester for peas which harvests the peas from pea pods on the vine after the vines are severed from the ground, in that, first the vines are cut and thereafter a conveyor delivers the vines and filled pods onto an endless conveyor thresher which threshes the peas from the pods while on this conveyor. The peas drop onto a secondary conveyor which conveys them to a storage receptacle.

An added feature of the present invention resides in the provision of an apparatus for economically harvesting peas through the use of a simple apparatus which can be operated by unskilled labor.

A further feature of the present invention resides in the provision of a pea harvester which includes a series of fishbacks or racks which apply a pounding action to the peas and vines to split open the pods and to separate the pods from the peas.

A feature of the present invention resides in the provision of a pea harvester including a series of movably supported fishbacks or racks in alternate pairs, certain of which act to impart a pounding action to the pea pods while the remaining racks are elevated. These racks act not only to open the peas but also to move the pods and vines rearwardly until they are discharged from the apparatus.

A further feature of the present invention resides in the provision of a conveyor formed of sieve like elements capable of permitting the peas to pass through the conveyor while carrying the pods and vines to the discharge.

A further feature of the present invention resides in the provision of a pea harvester including a conveyor formed of sieve like plates which are pivotally supported so as to form an elongated sieve or screen while horizontal and which swing into vertical position while moving along the return path so that the peas can drop through the lower layer of the conveyor without interference.

A further feature of the present invention resides in the provision of fish backs or racks which are supported in a frame, movable as a whole, longitudinally of the conveyor. Means are provided to move the fish backs rearwardly with the frame as they oscillate or move to impart a dragging action to the vines and pods.

These and other objects and novel features of my invention will be more clearly and fully set forth in the following specification and claims.

In the drawings forming a part of the specification:

Figure 4 is a plan view of one of the sieve like members forming the endless conveyor.

Figure 5 is a transverse sectional view through the plate shown in Figure 4, the position of the section being indicated by the line 5—5 of Figure 4.

Figure 6 is a sectional detail view showing the manner in which the upper course of the conveyor is supported.

Figure 7 is a sectional view of a detail portion of the apparatus.

Figure 8 is a view similar to Figure 2 showing a modified support for the fishbacks or racks.

Figure 1:
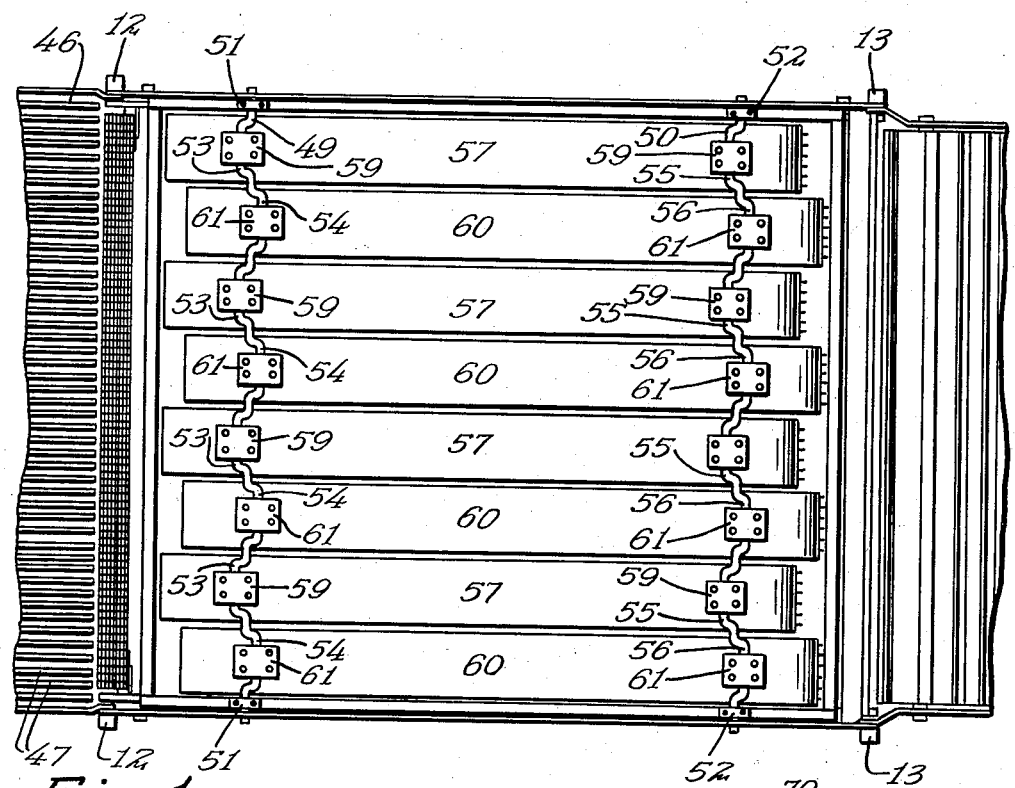
Figure 1 is a top plan view of the operating portion of a pea harvester showing the construction thereof.

The pea harvester apparatus is only shown diagrammatically in the drawings in order to simplify the description and drawings. The harvester is shown as supported by wheels 10 and includes a body member having a bottom wall 11 and posts such as 12 and 13 extending upwardly therefrom to support side panels such as 14. The extent of these panels may be varied but the panels are designed to enclose the sides of the apparatus.

An endless conveyor 15 acts to conduct the peas and pea vines from the cutter located at the forward end of the harvester. The conveyor is supported by suitable sprockets such as 16 mounted upon transverse shafts 17 driven in any manner from a suitable source of power. The peas and vines from the conveyor 15 are directed by an inclined baffle 19 to the endless conveyor which is indicated in general by the numeral 20.

The conveyor 20 includes chains at opposite sides of the apparatus, the chains being supported by suitable sprockets 21 and 22 supported upon transverse shafts 23 and 24, respectively. The conveyor is made up of a series of sieve like members 25 of the type best indicated in Figures 4 and 5 of the drawings. The chains 20 are supported throughout the upper course of the conveyor in the manner best shown in Figure 6 of the drawings.

Figure 6 illustrates the chains 20 as riding upon the horizontal flange 26 of an angular member 27 secured to the supporting posts 12 and 13. An opposed angular member 29 has a horizontal flange 30 extending above the chain 20. Spaced links of the chain 20 are provided with angular clips 31 having a horizontal flange 32 to which pivots 33 are secured. The pivots 33 may be welded or otherwise secured to the under surface of the clips 31. An angular member 34 has a horizontal flange 35 on which the pins 33 may slide for support.

The sieve members 25 are provided along opposite transverse edges with narrow plates 36 and 37 which serve to support a series of spaced bars 39 welded or otherwise affixed to the plates 36 to extend upwardly therefrom. The bars 39 are preferably rectangular in cross section and are welded with one corner in surface contact with each plate 36 and 37. These bars 39 are spaced apart a distance sufficient to permit a pea to drop therebetween, this distance being normally insufficient to accommodate the pods. Rods 40 are secured to the upper corners of the bars 39 to extend at right angles to the bars. As the bars 39 extend transversely of the apparatus with respect to the normal direction of travel, the rods 40 extend longitudinally thereof. The rods 40 and bars 39 form a screen or sieve like structure through which the pods and vines cannot pass.

Sockets 41 are secured in axial alignment to the under surface of the plates 36 and 37 to accommodate the pivots 33. Thus the sieve plates are hingedly attached at opposite points to the conveyor chains 20 for a purpose which will be later described in detail. Beneath the upper course of the conveyor I provide longitudinally extending angles 42 which are supported in any suitable manner from opposite sides of the harvester. Each sieve plate 25 is equipped with a longitudinally extending angle member 43 designed to ride over the angle 42. The angles 43 are diagonally welded or otherwise secured to the under surface of the sieve plates 25 and act to hold these sieve plates in a horizontal plane as they pass along the upper course of the conveyor.

The conveyor 20 is operated by a suitable drive mechanism not illustrated in detail in the drawings. The drive may comprise a connection with the power take off of a tractor or the like or may comprise an electric motor driven by suitable batteries connected to a generator. As the manner of powering the apparatus is believed a matter of choice, the details of the construction are not believed of particular importance in the present invention.

From the foregoing description it will be clear that when the conveyor 20 is in operation it moves rearwardly at a slow rate of speed carrying pea vines and pea pods rearwardly. The peas drop through the sieve plates of the conveyor and through the lower flight of the conveyor. As will be evident from Figure 2 of the drawings, the sieve plates swing into vertical position as they pass over the sprocket 21 and, thus, do not interfere with the dropping of the peas.

An endless conveyor belt 44 is mounted upon suitable pulleys 45 and 38 at opposite ends of the body of the harvester beneath the conveyor 20. Thus the shelled peas drop through the conveyor and onto the endless belt 44 which conveys the peas rearwardly to a suitable receptacle 48. This receptacle 48 may be of any suitable type and may, if desired, incorporate a transversely extending conveyor which is capable of moving the peas laterally from the apparatus.

A baffle 46 is provided closely adjacent the rear end of the conveyor 20 to receive vines and pea pods which are carried by the sieve plates the length of the conveyor. The baffle 46 draws these vines and pods to any suitable discharge mechanism leaving from the apparatus. As is indicated in Figure 1 of the drawings, the baffle 46 usually includes a series of spaced fingers 47 extending to a point closely adjacent to the conveyor 20.

As is indicated in Figure 1 of the drawings, a pair of crank shafts 49 and 50 are mounted to extend transversely of the conveyor 20 at longitudinally spaced points thereon. Bearings 51 are provided at opposite ends of the crank shaft 49 for rotatably supporting the same. Similar bearings 52 act as a support for the crank shaft 50.

The crank shafts 49 and 50 are similarly constructed and include oppositely directed crank pins which are alternately off set on opposite side of the crank axis. In other words, the crank shaft 49 includes aligned crank pins 53 which are off set from the axis of the crank shaft a predetermined equal distance. Alternate crank pins 54 extend on the opposite side of the crank shaft axis from the crank pins 53 and are equally off set from the crank axis.

In a similar manner the crank 50 includes a series of crank pins 55 which are off set from the axis of the crank shaft an equal amount and alternate crank pins 56 which are off set from the crank shaft in a diametrically opposite direction. The crank pins 53 and 55 are connected to racks or fishbacks 57 by bearing members 59. The alternate crank pins 54 and 56 are connected to alternate racks or fishbacks 60 by bearings 61. The bearing members 59 and 61 are of identical form but are given different identifying numerals in order to distinguish between the racks to which they are connected.

As is evident from Figure 7 of the drawings, each of the bearings such as 59 includes a bearing block 62 through which a crank pin such as 53 may extend. These blocks are also provided with four vertical apertures 63 therethrough which are of proper size to slidably accommodate vertically extending bolts 64. The bolts 64 extend through the fishbacks 57 to connect the fishbacks or racks to the bearings. The lower ends of the apertures 63 are enlarged to provide spring sockets 65. Springs 66 extend between the bases of the socket 65 and the upper surfaces of the racks 57 to normally urge the racks downwardly until the nuts 67 of the bolts 64 engage the top of the bearing block 62.

Figure 2:
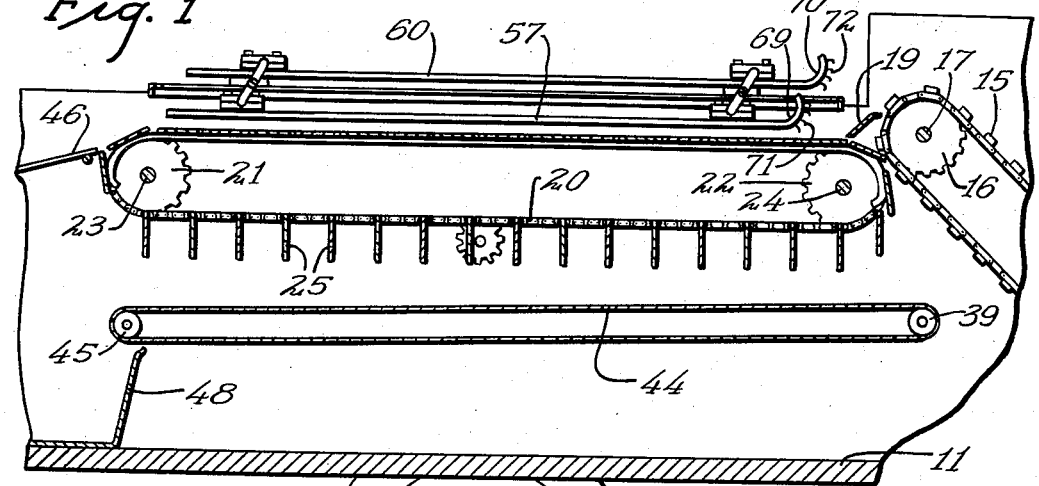
Figure 2 is a longitudinal sectional view through the apparatus shown in Figure 1.

Each of the fishbacks 57 and 60 are provided with an upwardly curved forward end which is best illustrated in Figure 2 of the drawings and designated by the numerals 69 and 70. These upturned ends are provided with projecting hook-shaped elements 71 and 72, respectively, which project forwardly and downwardly from the upturning rack ends. The elevation of the racks as compared with the upper surface of the conveyor 20, may be best adjusted by adjusting the nuts 67 on the bolts 64.

Figure 9:
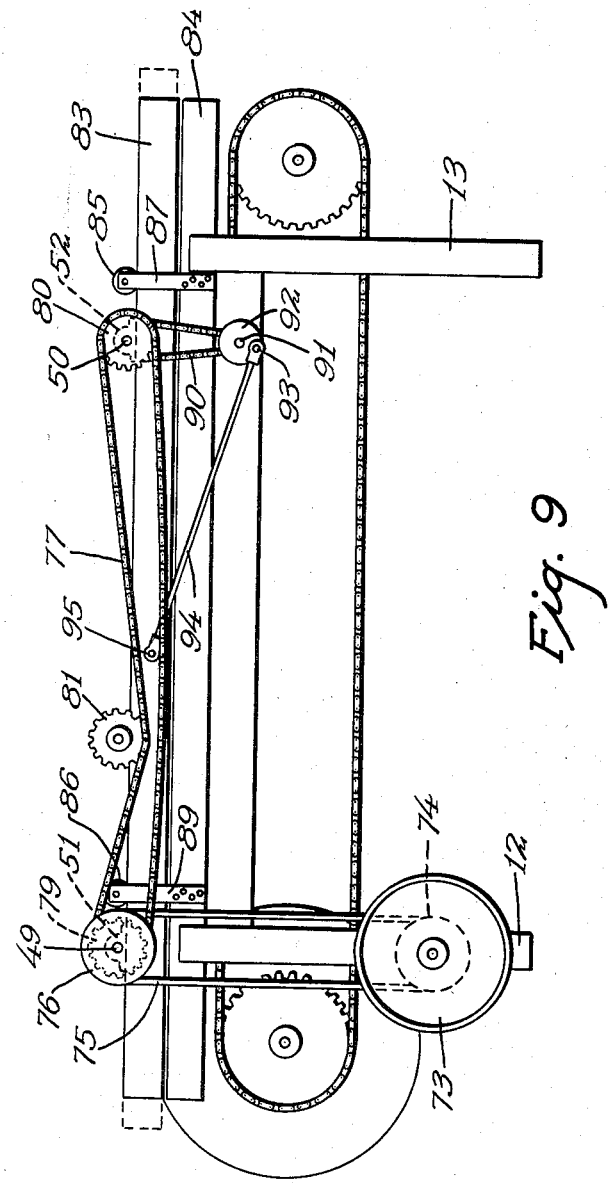
Figure 9 is a side elevational view of the pea harvester showing the structure diagrammatically.

The drive wheel 73 illustrated in Figure 9 is connected with a pulley 74 which is connected by a belt 75 to a pulley 76 on the rearmost crank shaft 49. A chain 77 connects a sprocket 79 rotatable with the pulley 76 to a similar sprocket 80 on the forward crank shaft 50. An idle sprocket 81 takes up any slack in the chain 77.

Upon rotation of the drive wheel 73 from any suitable source of power, the crank shafts 49 and 50 are rotated in unison. Rotation of the crank shafts in a clockwise direction, as viewed in Figure 2, causes each of the racks to move in an orbital path. In other words, the rack 60 shown in Figure 2 tends to move forwardly and downwardly until the crank pins are on a horizontal plane with the crank shaft axis. Further rotation of the crank shafts will cause these racks 60 to swing downwardly and rearwardly. During this action the hook-shaped projections 72 tend to grasp pea vines and direct them downwardly and onto the conveyor 20. As the crank shafts moves through vertical position, the racks 60 tend to move rearwardly and upwardly.

Figure 3:
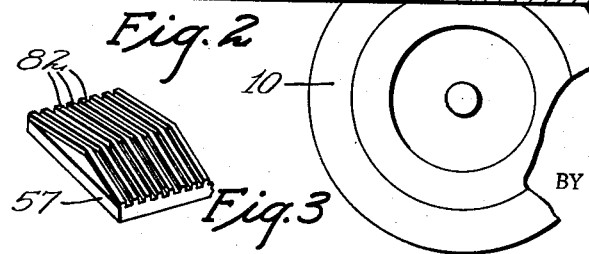
Figure 3 is a perspective detail view of the under side of one of the fish backs or racks.

As one series of fishbacks or racks moves rearwardly and upwardly, the opposite set of racks 57 swing forwardly and downwardly, following the same orbital path as was employed by the racks 60. As a result, alternating racks engage the vines with a downward and forward sweeping movement to draw the pea vines onto the conveyor. These racks also act to pound the vines against the sieve plates, acting to break open the pods. The pods, even when broken, remain with their various parts attached and are too large to pass through the openings in the sieve plates. The peas, however, fall through the sieve plates, through the lower portion of the conveyor 20 and onto the conveyor belt 44. The undersurfaces of the racks are preferably grooved as indicated in Figure 3 of the drawings, the grooves preferably being a herring bone shape, as indicated by the numeral 82. These grooves with their alternate ribs, provide a surface which will assist in breaking up the pods.

As is best indicated in Figure 9 of the drawings, the bearings 51 and 52 supporting the crank shafts 49 and 50, respectively, are mounted upon a frame 83 which is longitudinally slidable. The frame 83 rests upon a fixed frame member 84 secured to the uprights 12 and 13. Rollers 85 and 86 supported by connecting straps 87 and 89 extend over the frame 83 and hold it from raising.

A chain 90 connects a sprocket on the crank shaft 50 to a corresponding sprocket on a parallel shaft 91. The sprockets are properly proportioned so as to rotate the shaft 91 at half the speed of the crank shaft 50. An eccentric or crank disc 92 is mounted upon the shaft 91, the disc 92 including a crank pin 93. A connecting rod or pitman 94 is pivotally supported by the crank pin 91 and is pivotally connected at its opposite end 95 to the frame 83. Thus, as the crank shafts rotate, the frame 83 slides longitudinally.

By mounting the disc 92 for rotation at twice the speed of the crank shaft 50, an arrangement is provided whereby the frame 83 may be moved rearwardly during the time the cranks supporting the racks 57 and 60 are in engagement with the pea vines and pods. In other words, the arrangement is timed so that when the crank pins supporting the racks 57 and 60 are inclined forwardly and downwardly at an angle of approximately forty-five degrees, the frame 83 supporting the crank shafts starts movement rearwardly. This movement is maximum when the cranks supporting the racks are in a downward vertical position and continues until the crank pins are at an angle of approximately forty-five degrees downwardly and rearwardly from the axis of the crank shaft. The pitman 94 then acts to move the frame 83 forwardly during the next ninety degree movement of the crank shafts and again moves the frame rearwardly as the opposite racks start to engage the pea vines. In other words, this arrangement increases the sliding movement of the racks acting to draw the vines rearwardly and imparting a pounding action to the pea vines while the racks travel rearwardly.

In Figure 8 of the drawings I disclose a modified form of construction. In this arrangement the racks or fishbacks are mounted at their forward ends in the same manner as in the previous construction. However, the rear ends of these racks are differently mounted so as to limit the distance of movement of the racks from the conveyor and to insure a thorough harvesting of the peas.

In the arrangement diagrammatically illustrated in Figure 8, the racks or fishbacks are indicated by the numerals 96 and 97. A crank shaft 99 identical to the forward crank shaft 50 and similarly supported and driven, is mounted on suitable transversely aligned bearings similar to the bearings 51 and 52. Upon rotation of the crank shaft 99, the forward ends of the racks 96 and 97 travel in an orbital path and act to provide a pulling and a pounding action upon the pea vines.

The rear ends of the racks 96 and 97 are provided with bearings 100 and 101 which are identical with the bearings 59 and 61. A shaft 102 is supported by suitable means, not illustrated, to rotate or oscillate on an axis transverse of the apparatus and spaced above the main frame. Links or arms 103 and 104 are pivotally supported upon the shaft 102 and oscillate back and forth as the crank shaft 99 rotates. In other words, the rear ends of the racks are not driven and merely swing forwardly and rearwardly about the shaft 102 upon rotation of the crank shaft 99.

It will be seen that I have provided a simple and effective mechanism for removing the peas from pods and vines. The beating action of the racks or fishbacks may be regulated to properly accommodate peas of various sizes and various types. For example, in dealing with small, young peas the action must differ from that used when harvesting older, larger peas. The apparatus may also be used for the harvesting of soy beans and other such products and in some instances it is necessary to change the sieve plates so that these plates will accommodate peas of a certain type. This may be done by spreading the chains of the conveyor 20 so that the sieve plates may be disengaged and removed. The arrangement disclosed in Figure 8 may also be readily put into use by merely removing the rear crank shaft 49 and connecting the bearings 59 and 61 to supporting links hung from a transverse shaft mounted above the body of the device.

In accordance with the patent statutes, I have described the principles of construction and operation of my pea harvester and while I have endeavored to set forth the best embodiment thereof, I desire to have it understood that obvious changes may be made within the scope of the following claims without departing from the spirit of my invention.

I claim:

1. In a pea thresher, a conveyor including a pair of spaced chains, longitudinally spaced sieve plates hingedly connected on opposed pivots to said chains, each said sieve plate including a series of transverse rectangular bars arranged with corners of the bars uppermost, longitudinally extending transversely spaced rods connecting the uppermost corners of said bars to hold the bars in properly spaced relation, said rods and bars forming grids through which peas, but not pods or vines may pass, a series of racks disposed above said sieve plates, and means moving an end of said racks in an orbital path toward and away from said sieve plates and travelling at the bottom of the orbital path in the same direction as said plates.

2. A pea thresher including in combination an elongated conveyor having a generally horizontal flight of movement, a crank shaft having a series of off set crank pins mounted for rotation transversely of said conveyor, drive means for said conveyor and said crank shaft, a series of racks extending longitudinally of said conveyor and connected to said crank pins for movement in an orbital path, said crank shaft upon rotation operating to move said racks downwardly toward said conveyor and in the same direction of movement as said conveyor as they pass through the lower part of their orbital path, said racks being operable to impart a pounding action upon peas and vines carried upon the horizontal flight of said conveyor, said conveyor including a series of sieve plates and a pair of chains hingedly supporting said sieve plates, said sieve plates swinging into vertical position after passing through said horizontal flight of said conveyor and including means for holding said plates in horizontal relation as they move along said horizontal flight.

3. A pea thresher including in combination a conveyor having a horizontal flight of movement, a series of racks extending longitudinally of said conveyor and above the same, a pair of crank shafts rotatably supported transversely of said conveyor and above the same, said crank shafts having alternate crank pins arranged on opposite sides of the crank shaft axis, means connecting said crank pins to said racks to move said racks in an orbital path toward and away from the horizontal flight of said conveyor, drive means for said conveyor and said crank shafts, said crank shafts moving said racks in the direction of movement of the conveyor as they move toward the conveyor, and means for actuating said crank shafts and conveyor to impart a pounding action upon peas and vines on said conveyor, said conveyor comprising a pair of transversely spaced chains, sieve plates supported between said chains, said sieve plates including longitudinally spaced transverse bars, and longitudinally extending rods connecting said transverse bars and forming a grid through which peas, but not pods or vines, may pass.

4. A pea thresher including in combination a conveyor having a horizontal flight of movement, a series of racks extending longitudinally of said conveyor and above the same, a pair of crank shafts rotatably supported transversely of said conveyor and above the same, said crank shafts having alternate crank pins arranged on opposite sides of the crank shaft axis, means connecting said crank pins to said racks to move said racks in an orbital path toward and away from the horizontal flight of said conveyor, drive means for said conveyor and said crank shafts, said crank shafts moving said racks in the direction of movement of the conveyor as they move toward the conveyor, and means for actuating said crank shafts and conveyor to impart a pounding action upon peas and vines on said conveyor, and means slidably supporting said crank shafts for movement generally parallel to said horizontal flight of said conveyor, and means for sliding said crank shafts in the direction of movement of said conveyor as each rack moves into proximity with said conveyor.

References Cited in the file of this patent
UNITED STATES PATENTS

| | | |
|---|---|---|
| 565,724 | Cheek et al. | Aug. 11, 1896 |
| 693,926 | Thomas | Feb. 25, 1902 |
| 891,096 | Pope | June 16, 1908 |
| 1,112,194 | Carpenter | Sept. 29, 1914 |
| 1,257,592 | Ek | Feb. 26, 1918 |
| 1,791,365 | Lien | Feb. 3, 1931 |
| 1,803,131 | Pierson | Apr. 28, 1931 |
| 1,972,369 | Allen | Sept. 4, 1934 |
| 2,474,051 | Hatch | June 21, 1949 |
| 2,606,559 | Maus | Aug. 12, 1952 |
| 2,608,973 | Coons | Sept. 2, 1952 |
| 2,769,294 | Goodlad | Nov. 6, 1956 |